United States Patent
Mayo et al.

(10) Patent No.: US 8,168,359 B2
(45) Date of Patent: May 1, 2012

(54) NANOSIZED PARTICLES OF PHTHALOCYANINE PIGMENTS

(75) Inventors: James D. Mayo, Mississauga (CA); Rina Carlini, Oakville (CA); Adela Goredema, Mississauga (CA); Peter G. Odell, Mississauga (CA); Jeffrey H. Banning, Hillsboro, OR (US)

(73) Assignee: Xerox Corporation, Norwalk, CA (US)

( * ) Notice: Subject to any disclaimer, the term of this patent is extended or adjusted under 35 U.S.C. 154(b) by 1023 days.

(21) Appl. No.: 12/054,915

(22) Filed: Mar. 25, 2008

(65) Prior Publication Data
US 2009/0226835 A1    Sep. 10, 2009

Related U.S. Application Data

(60) Provisional application No. 61/035,334, filed on Mar. 10, 2008.

(51) Int. Cl.
G03G 9/09    (2006.01)

(52) U.S. Cl. ............... 430/108.21; 430/108.1; 106/411; 106/31.49; 540/122; 540/139

(58) Field of Classification Search ............. 430/108.1, 430/108.21; 106/411, 31.49; 540/122, 139
See application file for complete search history.

(56) References Cited

U.S. PATENT DOCUMENTS

| | | | |
|---|---|---|---|
| 5,278,020 A | 1/1994 | Grushkin et al. | |
| 5,290,654 A | 3/1994 | Sacripante et al. | |
| 5,308,734 A | 5/1994 | Sacripante et al. | |
| 5,318,623 A | 6/1994 | Azuma et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,403,693 A | 4/1995 | Patel et al. | |
| 5,418,108 A | 5/1995 | Kmiecik-Lawrynowicz et al. | |
| 5,679,138 A | 10/1997 | Bishop et al. | |
| 5,998,609 A * | 12/1999 | Aoki et al. | 540/140 |
| 6,221,137 B1 * | 4/2001 | King et al. | 106/31.29 |
| 6,472,523 B1 | 10/2002 | Banning et al. | |
| 6,476,219 B1 * | 11/2002 | Duff et al. | 540/128 |
| 6,689,525 B2 * | 2/2004 | Itabashi | 430/108.22 |
| 2006/0076298 A1 * | 4/2006 | Nakanishi et al. | 210/702 |
| 2007/0012221 A1 | 1/2007 | Maeta et al. | |

FOREIGN PATENT DOCUMENTS

| | | |
|---|---|---|
| EP | 1 036 824 A2 | 9/2000 |
| JP | A-57-151654 | 9/1982 |
| JP | A-61-203175 | 9/1986 |
| JP | A-63-207858 | 8/1988 |
| WO | 2006/005536 | 1/2006 |
| WO | 2006/132443 | 12/2006 |
| WO | 2007/038662 | 8/2007 |

OTHER PUBLICATIONS

A. N. Cammidge et al., "Synthesis and Characterisation of some 1,4,8,11 ,I 5,18,22,25-Octa(alkoxymethyl)-phthalocyanines; a New Series of Discotic Liquid Crystals," *J. Chem. Soc. Perkin Trans.*, vol. 1, pp. 3053 (1991).
A. Sastre et al., "Synthesis of Novel Unsymmetrical Substituted Push-Pull Phthalocyanines," *J. Org. Chem.*, vol. 61, No. 24, pp. 8591-8597 (1996).
C. Picchoki ct al., "Synthesis of Polar Discogen. A New Type of Discotic Mesophase," *Chem. Comm.*, pp. 259-260 (1985).
E. Orthmann et al., "Preparation of Ultrathin Layers of Molecularly Controlled Architecture from Polymeric Phthalocyanines by the Langmuir-Blodgett-Technique," *Angew. Chem. Int. Ed. Engl.*, vol. 25, pp. 1105-1107 (1986).
G. Pawlowski et al., "A Convenient Synthesis of Octasubstituted Phthalocyanines," *Synthesis*, pp. 287-289 (1980).
J. G. Young et al., "Synthesis and Characterization of Di-disubstituted Phthalocyanines," *J. Org. Chem.*, vol. 55, No. 7. pp. 2155-2159 (1990).
K. Balakrishnan et al., "Effect of Side-Chain Substituents on Self-Assembly of Perylene Diimide Molecules: Morphology Control," *J. Am. Chem. Soc.*, vol. 128, p. 7390-7398 (2006).
K. Ohta et al., "Influence of the Nature of the Side Chains on the Mesomorphic Properties of Octasubstituted Phthalocyanine Derivatives. Annelidcs XXIX," *New J. Chem.*, col. 12, pp. 751-754 (1988).
M. J. Cook et al., "Octa-alkoxy Phthalocyanine and Naphthalocyan ine Derivatives: Dyes with Q-Band Absorption in the Far Red or Near Infrared," *J. Chem. Soc. Perkin Trans.*, vol. 1, pp. 2453-2458 (1988).
N. B. McKeown et al., "Synthesis and Characterisation of some 1,4,8.11 ,1 5,1 8,22,25-Octa-alkyl- and 1,4,8,11,I 5,18-Hexa-alkyl-22,25-bis(carboxypropyl)phthalocyanines," *J. Chem. Soc. Perkin Trans.*, vol. 1, pp. 1169-1177 (1990).
N. B. McKeown et al., *Phthalocyanine Materials*, Cambridge University Press, Chapter 1, Table 1.1, pp. 4-6 (1998).
N. Kobayashi et al., "Symmetrically Tetra-substituted Phthaiocyanines," *Chem. Soc. Chem. Comm.*, pp. 390-392 (1987).

* cited by examiner

*Primary Examiner* — Peter Vajda
(74) *Attorney, Agent, or Firm* — Oliff & Berridge, PLC

(57) ABSTRACT

Nano-sized phthalocyanine pigment particles include a phthalocyanine chromogen structure as the main component, and a substituted soluble metal-phthalocyanine dye as a minor component that is associated non-covalently with the phthalocyanine chromogen structure, wherein the presence of one or more sterically bulky substituents on the substituted soluble metal-phthalocyanine dye limits an extent of pigment particle growth and aggregation, to afford nano-sized pigment particles.

20 Claims, No Drawings

NANOSIZED PARTICLES OF PHTHALOCYANINE PIGMENTS

This nonprovisional application claims the benefit of U.S. Provisional Application No. 61/035,334, filed Mar. 10, 2008.

TECHNICAL FIELD

This disclosure is generally directed to nanoscale pigment particle compositions, and methods for producing such nanoscale pigment particle compositions, as well as to uses of such compositions, for example, in ink compositions. More specifically, this disclosure is directed to nanometer-sized particles of phthalocyanine pigments synthesized in the presence of a crystal growth regulator compound that is a substituted soluble metal-phthalocyanine dye derivative having one or more bulky functional groups. Such nanometer-sized pigment particles are useful, for example, as colorizing agents for ink jet inks, printing inks, toner compositions, paints and coatings, resins, and the like.

REFERENCES

The concept of using crystal growth inhibitors such as pyromellitic diimide, trimellitic acid, and aromatic sulphonic acid has been reported in the literature. See, for example, Japanese Patent Publications Nos. JP 63-207858 to F. Taira and K. Noriaka entitled "Production of copper Phthalocyanine Pigment" (1998), JP 61-203175 to T. Masao and S. Takashi entitled "Production of Copper Phthalocyanine" (1986), and JP 57-151654 to Y. Nobuo, A. Kazuyuki, and S. Ichiro entitled "Preparation of Copper Phthalocyanine Pigment having low Chlorination degree." These crystal growth inhibitors are used during synthesis of the copper phthalocyanine pigment in order to produce micronized pigment particles of conventional size (about 100-500 nm) without additional processing steps after synthesis, such as either dry milling or acid-pasting reprecipitation processes.

Use of derivatized phthalocyanine compounds as crystal growth inhibitor agents or additives is reported in, for example, EP 1 036 824. However, in that disclosure, the composition of the derivatized phthalocyanine additives are typically mono-carboxamide derivatives and do not contain aliphatic, sterically bulky alkyl chains for the purpose of imposing a steric barrier to modulate crystal packing. Furthermore, the patent discloses data for specific surface area of the pigments that is typically found for larger-sized pigment particles having average particle sizes in the range of 200-500 nm.

U.S. Pat. No. 5,318,623 discloses a process for producing a metal phthalocyanine pigment particles of a fine particle size, whereby the pigment is synthesized using conventional methods, and allowing the reaction mixture to react while simultaneously applying a mechanical grinding force in the presence or absence of a grinding agent.

WO 2007/088662 describes a process for producing fine phthalocyanine pigment particles, which comprises dissolving a phthalocyanine pigment in a good solvent containing a pigment dispersant comprising a compound represented by the formula:

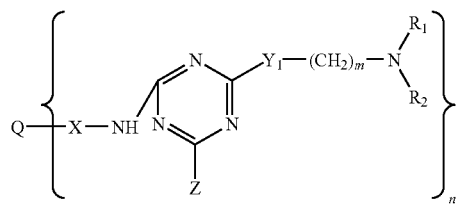

to prepare a pigment solution and mixing the solution with a solvent that is compatible with that good solvent and is a poor solvent for the phthalocyanine pigment to precipitate the phthalocyanine pigment as nanometer-size particles. In the formula, Q represents a residue of an organic dye selected among anthraquinone dyes, etc.; X represents —CO—, etc.; Y1 represents —NH— or —O—; Z represents hydroxy, etc.; $R_1$ and $R_2$ each independently represents alkyl, etc.; m is an integer of 1-6; and n is an integer of 1-4.

U.S. Pat. No. 6,472,523 discloses compounds of the formula:

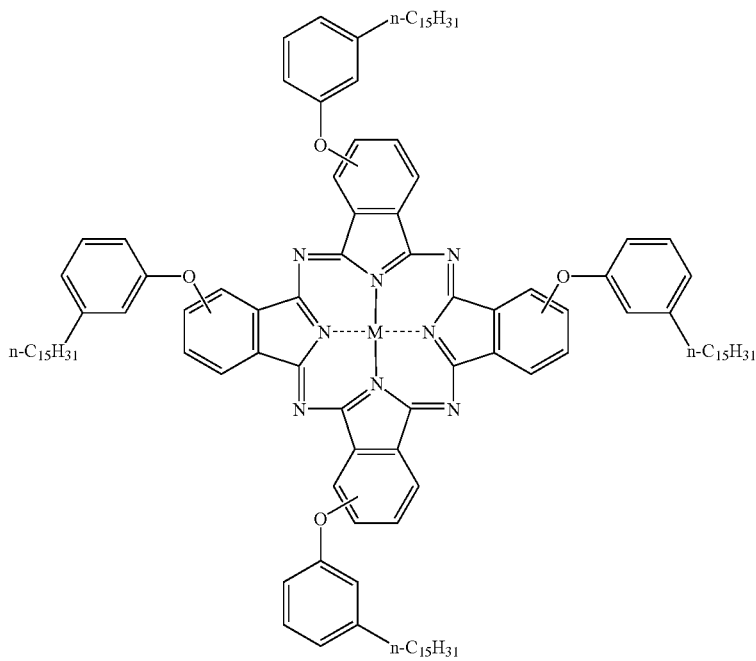

wherein M is an atom or group of atoms capable of bonding to the central cavity of a phthalocyanine molecule, wherein axial ligands optionally can be attached to M.

U.S. Pat. No. 6,476,219 describes that such compounds can be prepared by (a) reacting 3-n-pentadecylphenol with 4-nitrophthalonitrile in the presence of a base to form an alkylarylether adduct of phthalonitrile; and (b) reacting the alkylarylether adduct of phthalonitrile with either (i) a metal compound, or (ii) an ammonia-releasing compound in the presence of an alkanolamine solvent, or (iii) mixtures of (i) and (ii), to form the colorant.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

N. B. McKeown, *Phthalocyanine Materials*, Cambridge University Press, Chapter 1, Table 1.1 (1998) discloses about seventy atoms or groups that are known to bond in the central cavity of a phthalocyanine molecule.

J. G. Young et al., "Synthesis and Characterization of Di-disubstituted Phthalocyanines," *J. Org. Chem.*, Vol. 55, No. 7, p. 2155 (1990), discloses an improved approach to the synthesis of di-disubstituted phthalocyanines from two different phthalyl precursors wherein the resultant product contains two different R-groups. This method can be applied to the synthesis of both metal-free and metal-coordinated phthalocyanines.

A class of phthalocyanines that are soluble in common organic solvents is the peripherally octa-substituted compounds illustrated below. The substituents can occupy either the 1,4- or the 2,3-positions. When both groups $R_x$ and $R_y$ are the same, these compounds are generally obtained as a single isomer. The solubility in a given solvent is related to the nature and chain length of the R group ($R_x$ and/or $R_y$), with more than about five carbon atoms per chain being typical:

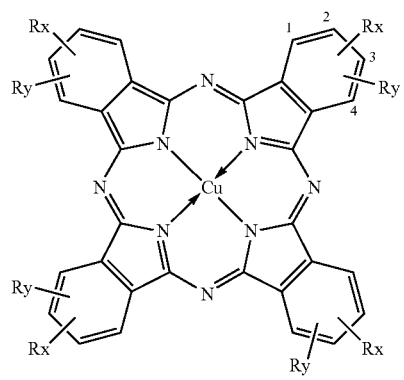

Many examples have been reported for this class, for example: 2,3-alkyl (K. Ohta, L. Jacquemin, C. Sirlin, L. Bosio, and J. Simon, *New J. Chem.*, 12 (1988), 751), 1,4-alkyl (N. B. McKeown, I. Chambrier, and M. J. Cook, *J. Chem. Soc. Perkin Trans.*, 1 (1990), 1169), 2,3-alkoxy (E. Orthmann and G. Wegner, *Angew. Chem. Int. Ed. Engl.*, 25 (1986), 1105), 1,4-alkoxy (A. N. Cammidge, M. J. Cook, K. J. Harrison, and N. B. McKeown, *J. Chem. Soc. Perkin Trans.*, 1 (19191), 3053), 2,3-alkoxymethylene (G. Pawlowski and M. Hanack, *Synthesis*, (1980), 287; and C. Piechoki and J. Simon, *Chem. Comm.* (1985), 259), 1,4-alkoxymethylene (M. J. Cook, A. J. Dunn, S. D. Howe, A. J. Thomson, and K. J. Harrison, *J. Chem. Soc. Perkin Trans.*, 1 (1988), 2453), and 2,3-alkyldicarboximide (N. Kobayashi, Y. Nishiyama, T. Oya, and M. Sato, *J. Chem. Soc. Chem. Comm.*, (1987), 390).

The disclosures of each of the foregoing patents and publications are hereby incorporated by reference herein in their entireties. The appropriate components and process aspects of the each of the foregoing patents and publications may also be selected for the present compositions and processes in embodiments thereof.

BACKGROUND

A printing ink is generally formulated according to strict performance requirements that are demanded by the printing technology intended for the ink, as well as customer needs. Whether formulated for office printing or for large volume production printing, a particular ink is expected to produce images that are robust and durable under stress conditions. Ink jetting devices are known in the art, and thus extensive description of such devices is not required herein. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot-melt solid inks that are typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper. In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

Pigments are a type of insoluble colorant that are useful in a variety of applications such as, for example, paints, plastics and inks, including inkjet printing inks. Dyes on the other hand, are readily soluble colorants and have typically been the colorants of choice for applications such as inkjet printing inks. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photo-oxidation from light (leads to poor lightfastness), dye diffusion from the ink into paper or other substrates (leads to poor image quality and showthrough), and the ability for the dye to leach into another solvent that makes contact with the image (leads to poor water-/solvent-fastness). In certain situations, pigments have the potential to be a better alternative as colorants for inkjet printing inks since they are insoluble and cannot be molecularly dissolved within the ink matrix, and in most cases do not experience colorant diffusion or color degradation. Pigments can also be significantly less expensive than dyes, and so are attractive colorants for use in all printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal nanoparticles, but rather as micron-sized large aggregates of crystals and often having a wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost.

Thus, there is a need addressed by embodiments of the present invention, for smaller nano-sized pigment particles that minimize or avoid the problems associated with conventional larger-sized pigment particles. There further remains a need for processes for making and using such improved nano-sized pigment particles as colorant materials. The present nanosized pigment particles are useful as robust colorizing agents in, for example, paints, coatings and inks (e.g., inkjet printing inks) as well as other compositions where pigments can be used such as plastics, optoelectronic imaging components, photographic components, and cosmetics among others.

SUMMARY

The present disclosure addresses these and other needs, by providing nanoscale or nanometer-sized or "nano-sized" pigment particles, that are derived from a phthalocyanine component and a minor amount of a substituted soluble metal-phthalocyanine component used as pigment crystal growth regulator, wherein both components are associated non-covalently in a way that controls the ultimate particle size and crystal morphology of the resulting nano-sized pigment particles. The present disclosure also provides methods for making such nano-sized pigment particles, and methods for using such particles, for example in electrophotographic toner and printing inks such as inkjet compositions.

More particularly, in embodiments, there is provided a synthesis method starting at the molecular level—commonly referred to as a "bottom up" process—for preparing nanostructured materials. This synthesis method desirably generates nanopigments by a self-assembling synthesis route that enables one to design features that can control particle size and shape and form size and shape-controlled toner particles. Moreover, a "bottom-up" synthesis method enables the ability to customize the design of the nanomaterial with versatile chemistry.

In an embodiment, the present disclosure provides nano-sized phthalocyanine pigment particles, comprising:

a phthalocyanine chromogen structure as the main component, and a substituted soluble metal-phthalocyanine dye as a minor component that is associated non-covalently with the phthalocyanine chromogen structure, wherein the presence of one or more sterically bulky substituents on the substituted soluble metal-phthalocyanine dye limits an extent of pigment particle growth and aggregation, to afford nano-sized pigment particles.

In another embodiment, the present disclosure provides a process for preparing nano-sized particles of phthalocyanine pigments, comprising:

providing one or more pigment precursors to a phthalocyanine pigment, providing a solution of a substituted soluble metal-phthalocyanine dye, precursors to a substituted soluble metal-phthalocyanine dye, or a mixture thereof, and carrying out a chemical reaction whereby the precursors to a phthalocyanine pigment are transformed into the final phthalocyanine pigment particles and the substituted soluble metal-phthalocyanine dye molecules are non-covalently associated with the phthalocyanine pigment, so as to limit an extent of particle growth and aggregation and result in nanoscale-sized pigment particles.

In the process, a multi-step process can be incorporated, which comprises reacting precursor raw materials of the pigment and/or substituted soluble metal-phthalocyanine dye or its precursor raw materials to form an intermediate colorant species; and adding a metal compound to the intermediate species which react so as to form the nano-sized particles of phthalocyanine pigment.

EMBODIMENTS

Embodiments of the present disclosure provide nano-sized phthalocyanine pigment particle compositions and methods for producing such nano-sized phthalocyanine pigment particle compositions. The term "nano-sized", "nanoscale", or "nanometer-sized pigment particles" refers to for instance, an average particle size, $d_{50}$, or an average particle diameter of less than about 150 nm, such as of about 1 nm to about 100 nm, or about 10 nm to about 80 nm. These nanometer-sized particles are thus distinguished, for example, from conventional pigment particles that can range in size from about 200 nm to beyond 1000 nm (1 micron) or more.

The nano-sized pigments in embodiments are formed from, and thus comprise, a phthalocyanine pigment structure, such as copper phthalocyanine, as the predominant component and a substituted soluble metal-phthalocyanine dye as the minor component. General structures of exemplary such materials are:

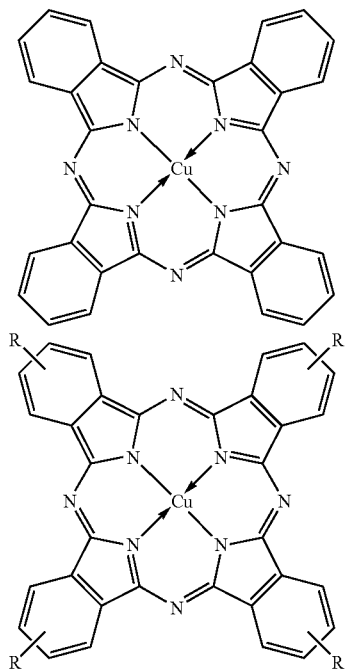

The substituted soluble metal-phthalocyanine dye is designed to have one or more substituents that are either hydrophobic or hydrophilic in polarity, but are necessarily large and/or long in chain length such that when the compound is dissolved in solution, the substituents offer a sterically bulky layer around the phthalocyanine chromogen, or colored core structure. Although not limited by any particular theory, it is believed that the phthalocyanine pigment and the minor component of substituted soluble metal-phthalocyanine dye do not chemically bond together, but rather the two compounds are associated through weak and non-covalent bonding interactions that take place during crystal formation and growth of the primary pigment particle. It is also thought that the final nano-sized pigment particles, which may further comprise aggregated primary pigment nanoparticles, consist of stacked layers of the phthalocyanine chromophore wherein the soluble dye molecules of substituted soluble metal-phthalocyanine can be intercalated between those face-stacked layers of the chromogen and/or associated at the termini of the pigment particle aggregates. The pigment crystal growth or pigment particle aggregation is believed to occur by a self-assembly mechanism, in which the sterically bulky, soluble metal-phthalocyanine dye molecules behave like crystal growth regulators of the phthalocyanine chromogen, which can either intercalate or interrupt the self-assembly of stacked layers of phthalocyanine pigment molecules. Aggregation and hence growth of the phthalocyanine pigment particles is thus limited by the presence of the non-covalently associated sterically bulky and soluble metal-phthalocyanine dye molecules, resulting in a phthalocyanine pigment crystal or primary particle of desired, finite nanometer-size.

The term "intercalated" refers, for example, to molecules of the soluble substituted metal-phthalocyanine dye being interpenetrated between stacked layers of the phthalocyanine chromogen or molecule. In addition to intercalation, the soluble dye molecules may also be associated with the copper phthalocyanine pigment nanoparticles at either the termini of crystal aggregates, at edges of crystal aggregates, as surface capping molecules, or as various combinations of all these modes of association, depending on the structure of the substituted metal-phthalocyanine dye.

The types of non-covalent chemical bonding that can occur between the precursor/pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the precursor/pigment.

In one embodiment, the nano-sized pigment particles comprise an unsubstituted phthalocyanine structure as a main component and a soluble, hydrophobically-derivatized metal-phthalocyanine dye as the minor component, the general structures of which are:

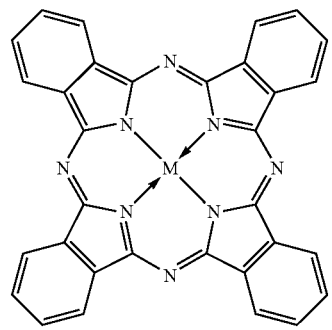

-continued

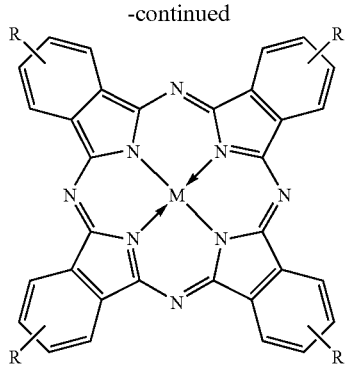

Thus, for example where M is Cu, the compounds are generally:

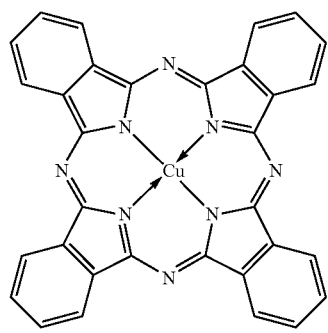

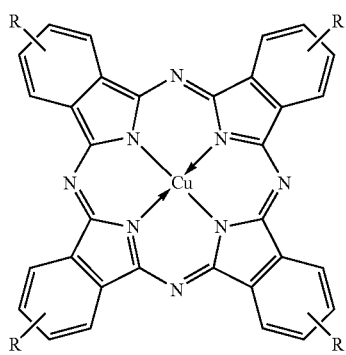

The unsubstituted phthalocyanine pigment component can be any suitable phthalocyanine pigment, such as either metal-free phthalocyanine and metal-containing phthalocyanines. In the case of the metal-containing phthalocyanines, the chromogen is formed around a coordinated central metal atom M, wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, butt not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus (III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

The substituted soluble metal-phthalocyanine dye can be any suitable phthalocyanine compound that is peripherally-substituted with sterically bulky aliphatic and/or aromatic functional groups. Exemplary compounds include those of the formula:

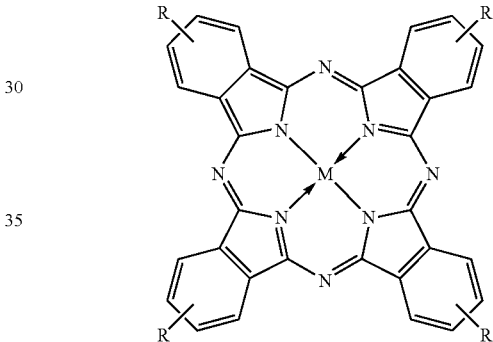

Suitable hydrophobically-substituted metal-phthalocyanine dyes include, for example, substituted metal phthalocyanines formed around a centrally coordinated metal atom M, wherein M is an atom or group of atoms capable of bonding to the central cavity of a phthalocyanine molecule, wherein axial ligands optionally can be attached to M. The metal-phthalocyanine is suitably peripherally-substituted with 1, 2, 3, or 4, or more, sterically bulky hydrophobic groups represented as functional group R above, although peripherally tetra-substituted metal-phthalocyanines are preferred for their efficacy in limiting pigment crystal growth to nanoparticle size. Peripherally tetra-substituted phthalocyanines that are soluble in organic media have substituents at the 2-(or 3-) positions, or at the 1-(or 4-) positions, as illustrated above, and typically have bulky (e.g. secondary- or tertiary-alkyl groups) or long alkyl chains (e.g., more than about 5 carbons) at those positions. Another class of phthalocyanines that are soluble in common organic solvents is the peripherally octa-substituted compounds illustrated below. The substituents can occupy either the 1,4- or the 2,3-positions. When both groups $R_x$ and $R_y$ are the same, these compounds are generally obtained as a single isomer. The solubility in a given solvent is related to the nature and chain length of the R group ($R_x$ and/or $R_y$), with more than about five carbon atoms per chain being typical:

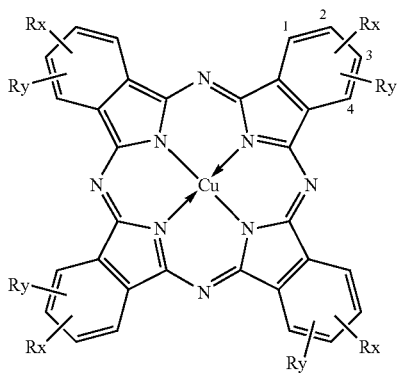

Many examples have been reported for this class, for example, 2,3-alkyl (K. Ohta, L. Jacquemin, C. Sirlin, L. Bosio, and J. Simon, *New J. Chem.*, 12 (1988), 751), 1,4-alkyl (N. B. McKeown, I. Chambrier, and M. J. Cook, *J. Chem. Soc. Perkin Trans.*, 1 (1990), 1169), 2,3-alkoxy (E. Orthmann and G. Wegner, *Angew. Chem. Int. Ed. Engl.*, 25 (1986), 1105), 1,4-alkoxy (A. N. Cammidge, M. J. Cook, K. J. Harrison, and N. B. McKeown, *J. Client. Soc. Perkin Trans.*, 1 (1991), 3053), 2,3-alkoxymethylene (G. Pawlowski and M. Hanack, *Synthesis*, (1980), 287; and C. Piechoki and J. Simon, *Chem. Comm.* (1985), 259), 1,4-alkoxymethylene (M. J. Cook, A. J. Dunn, S. D. Howe, A. J. Thomson, and K. J. Harrison, *J. Chem. Soc. Perkin Trans.*, 1 (1988), 2453), and 2,3-alkyldicarboximide (N. Kobayashi, Y. Nishiyama, T. Oya, and M. Sato, *J. Chem. Soc. Chem. Comm.*, (1987), 390). The entire disclosure of each of these references is incorporated herein by reference.

Exemplary suitable functional groups R (including groups $R_x$ and $R_y$) in the above formulas that can be attached to the periphery of the metal-phthalocyanine include organic aliphatic or aromatic groups, such as substituted or unsubstituted alkyl, aryl, alkylaryl, or arylalkyl groups, such as having from 1 to about 50 carbon atoms, or from about 4 to about 40 carbon atoms, or from about 10 to about 30 carbon atoms. The alkyl hydrocarbon groups can be either linear, branched or cyclic in structure, and can be fully saturated or may contain unsaturation such as having ethylenically unsaturated moieties or double bonds including C=O, C=N, C=S and the like. In addition, other suitable functional groups R that can be attached to the periphery of the metal-phthalocyanine include alkylenoxy groups, poly(alkylether) groups, aryloxy groups, alkyloxyaryl groups, aryloxyalkyl groups, alkylamino groups, alkylaminoaryl groups, and alkanecarbonyl groups R(C=O)—. The alkyl functional groups that are peripherally-substituted may also contain heteroatoms such as O, N, S, P, as well as halogen atom substituents such as Cl, Br, F, I. The aryl functional groups that are peripherally-substituted can be hydrocarbon-based or can also be heterocyclic aromatic groups, such as pyridyl, furanyl, pyrimidinyl, pyrazolyl, oxazolyl, pyrrolidinyl, pyranyl, and the like. Some reported examples of R-groups conferring, solubility include tert-butyl, neo-pentyloxy, 4-cumylphenoxy, oligo-(ethyleneoxy), long-chain alkylsulfamoyl $RNHSO_2$, long-chain alkyl carboxylate ROCO—, and long-chain alkyl carboxamide, RNHCO—, the disclosures of which are referenced in U.S. Pat. No. 6,472,523, and the entire disclosure of which is incorporated herein by reference above.

The hydrocarbon groups R can be unsubstituted or substituted with one or more groups selected from the group consisting of methyl, ethyl, propyl, iso-propyl, n-butyl, iso-butyl, sec-butyl, tert-butyl, n-pentyl, iso-pentyl, neo-pentyl, cyclopentyl, n-hexyl, cyclohexyl, n-heptyl, n-octyl, iso-octyl, cyclooctyl, bicyclo[2.2.2]heptanyl, bicyclo[2.2.2]octanyl, n-nonyl, decyl, undecyl, dodecyl, tridecyl, tetradecyl, pentadecyl, hexadecyl (or cetyl), octadecyl (or stearyl), iso-octadecyl (or iso-stearyl), eicosanyl, docosanyl, tetracosanyl, hexacosanyl, octacosanyl, triacontanyl, hexatriacontanyl and the like, vinyl, styrl, trimethylsiloxyl, trichlorosilylethyl, trichlorosilylpropyl, dichlorosilylethyl, chlorosilylethyl, phenyl, benzyl, naphthyl, anthranyl, phenanthryl, fluorenyl, norbornenyl, silanyl, siloxanyl, dimethylsilanyl, dimethylsiloxanyl, alkyloxy groups, phenoxy groups, benzyloxy groups, (meth)acryl, among others. In other embodiments, suitable examples of the functional groups attached to the metal-phthalocyanine include wax-like aliphatic groups. The term "wax-like aliphatic group" refers, for example, to a long, hydrophobic chain having at least 10 or at least 12 or at least 16 carbon atoms, such as having from about 10 to about 100 or from about 12 to about 50 or from about 16 to about 40 carbon atoms. The wax-like aliphatic group can be a saturated alkane hydrocarbon, such as poly(alkylene) wax like polyethylene, polypropylene, and the like, or can be unsaturated hydrocarbon like polybutadiene, polyisoprene, and the like, or can be a short saturated alkane group, either linear, branched or containing cyclic groups, such as hexadecyl, octadecyl, eicosanyl, docosanyl, tetracosanyl, hexacosanyl, octacosanyl, triacontanyl, hexatriacontanyl, or larger and including mixtures thereof. The wax-like aliphatic group can also have multiple reactive functional groups for attachment to the metal-phthalocyanine Examples of compounds having multiple reactive functional groups are the C-36 dimer diol, C-36 dimer diacid, or C-36 dimer diamine, which are commercial wax-like aliphatic compounds available from UNIQEMA® that contain either two alcohol, carboxylic acid, amino or isocyanate functional groups, respectively, and are manufactured by dimerization of oleic acid and derivatives. The wax-like aliphatic hydrocarbon can possess from 1 to about 10 reactive functional groups, such as 1 to about 6 reactive functional groups, or from 1 to about 4 reactive functional groups.

In embodiments, it is desired that the functional groups attached to the periphery of the metal-phthalocyanine be the same. That is, where the metal-phthalocyanine is di-, tri- or tetra-substituted, it is desired in embodiments that the 2, 3, or 4 substituted groups all be the same. However, in cases of obtaining peripherally tetra-substituted soluble phthalocyanine dyes, all four R groups need not be identical. Tetra-substituted phthalocyanines having different R groups have been described in "Synthesis of Novel Unsymmetrical Substituted Push-Pull Phthalocyanines," A. Sastre, B. del Rey, and T. Torres, *J. Org. Chem.*, 61 (24), 8591 (1996), the disclosure of which is totally incorporated herein by reference. This paper discloses the synthesis and characterization of novel, non-centrosymmetrically, push-pull substituted metal-free phthalocyanines. It is possible in embodiments to use different functional groups in the tetra-substituted soluble metal phthalocyanine dye to achieve the desired efficacy as a steric barrier agent and thus control or limit the extent of pigment crystal growth and particle size. When two, differently-substituted precursors are chemically converted to form phthalocyanine, a mixture of six different isomers are possible. However by using specially designed intermediates, it is possible to control the number of possible isomers. For example, "Synthesis and Characterization of Di-disubstituted Phthalocyanines," J. G. Young and W. Onyebuagu, *J. Org. Chem.*, Vol. 55, No. 7, p. 2155 (1990), the disclosure of which is totally incorporated herein by reference, discloses an improved approach to the synthesis of di-disubstituted phthalocyanines from two different phthalyl precursors wherein the resultant product contains two different R-groups. This method can be applied to the synthesis of both metal-free and metal-coordinated phthalocyanines.

Specific examples of suitable hydrophobically-substituted metal-phthalocyanine dyes include peripherally substituted metal phthalocyanines, such as tetra(4-pentadecylphenoxy)

copper phthalocyanine dye, the structure of which is shown for reference below. Peripherally tetra-substituted phthalocyanines having the same substituent at either position 2 or 3 are comprised of a mixture of four constitutional isomers, which are named according to their symmetry space group as $C_{4h}$, $D_{2h}$, $C_{2v}$, and $C_s$ in a ratio of 1:1:2:4, respectively, which are illustrated below and result from the statistical cyclotetramerization of four isoindolenine units (which are the mechanistic intermediates).

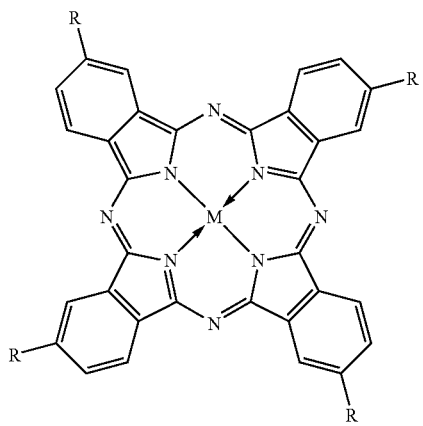
$C_{4h}$

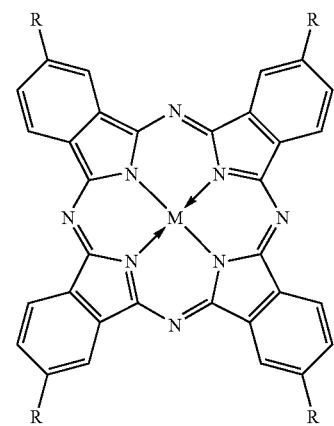
$D_{2h}$

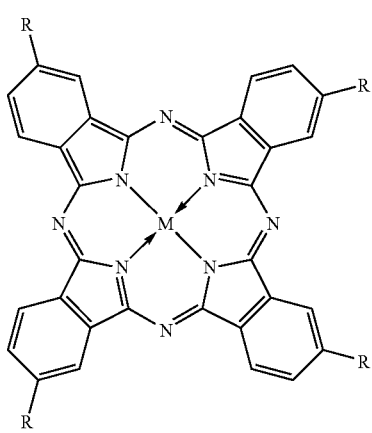
$C_{2v}$

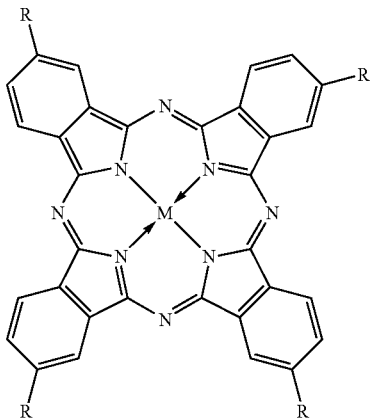
$C_s$

One particular class of suitable hydrophobic metal-phthalocyanine dyes include those of the structure:

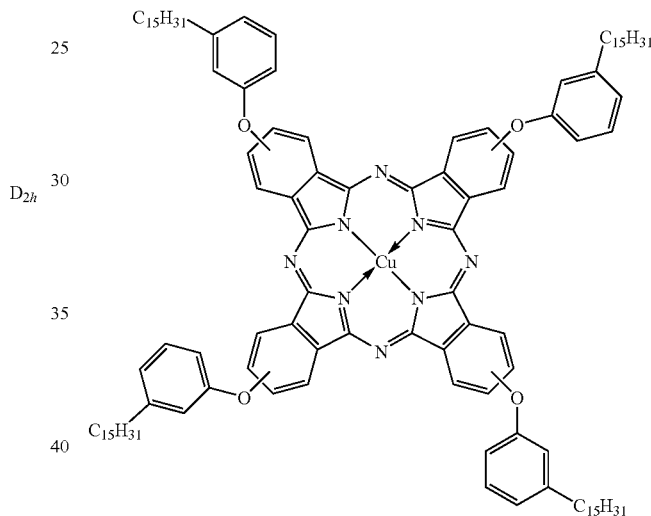

wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference. Examples of suitable atoms or group of atoms M include, but are not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron (III), chlorotitanium(III), chlorochromium(III), chloroaluminum, chlorogallium, chloroindium, chlorophosphorus(III), dichlorotitanium(IV), dichlorosilicon, dichlorogermanium, dichlorotin, and the like as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

Although not limited to any theory, it is believed that in most instances the colorant molecules of these hydrophobic metal-phthalocyanine dyes are obtained as mixtures of four isomeric forms as illustrated below, wherein the $C_{4h}$, $D_{2h}$, $C_{2v}$, and $C_s$ isomers are present in the approximate ratio of, respectively, about 1:1:2:4:

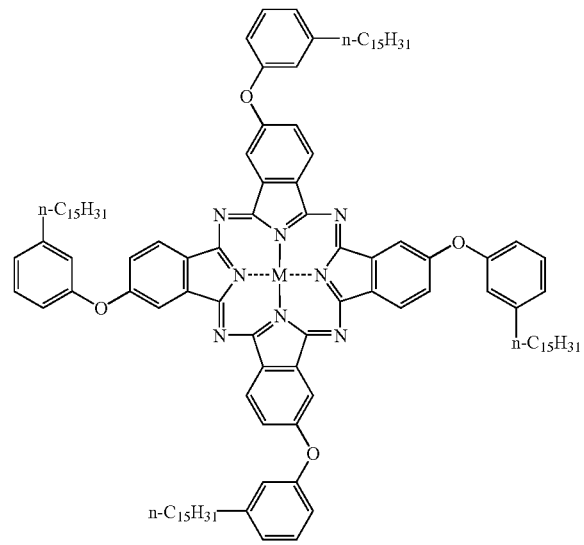

$C_{4h}$

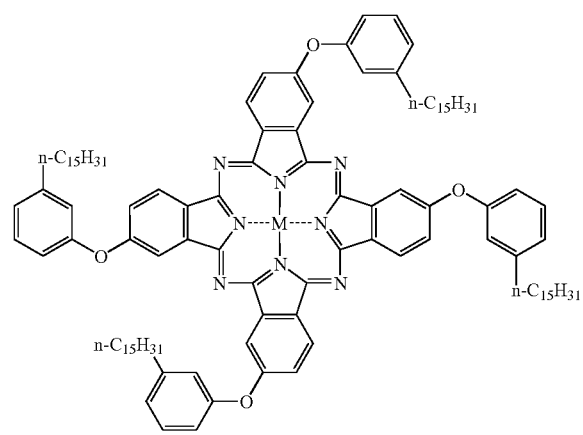

$D_{2h}$

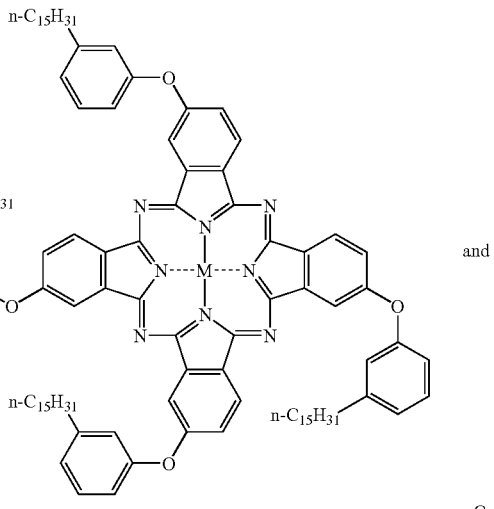

$C_{2v}$ and

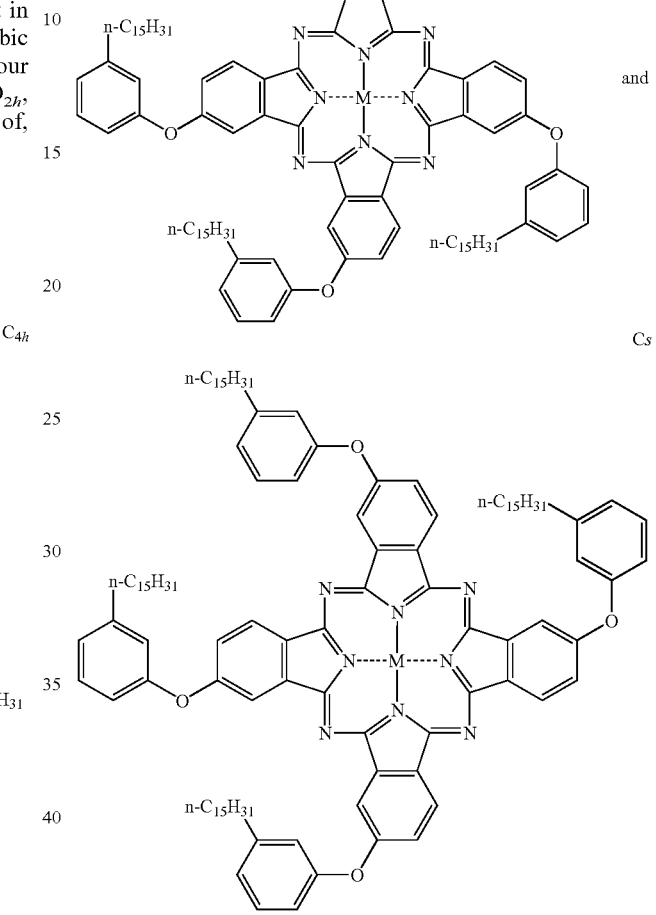

$C_s$

These hydrophobically-substituted soluble metal-phthalocyanine dyes can be prepared by any desired or effective process. In one embodiment, the process for making the alkylaryl ether tetra-substituted phthalocyanine is carried out in two steps, the first of which is the synthesis of the substituted phthalonitrile pigment precursor (for example, 4-(3-n-pentadecyl)phenoxyphthalonitrile).

This process can be carried out by reacting the desired alkyl-substituted phenol, for example a $C_{15}$ phenol (3-n-pentadecylphenol) with 4-nitrophthalonitrile in the presence of a base. Examples of suitable $C_{15}$ phenols are commercially available as, for example, CARDOLITE®, predominantly a metal $C_{15}$ alkyl phenol obtained from cashew nut distillation and containing small amounts of naturally occurring isomers thereof, available from Cardolite Corporation, Newark, N.J., and AF 6518, available from Palmer International Inc., Worchester Pa., also predominantly a metal $C_{15}$ alkyl phenol obtained from cashew nut distillation and containing small amounts of naturally occulting isomers thereof. Suitable bases include both organic and inorganic bases. Examples of organic bases include (but are not limited to) trialkyl amines (including triethylamine, tripropylamine, tributylamine, and the like), piperidine, 1,4-diazabicyclo[2.2.2]octane, and the like, as well as mixtures thereof. Examples of inorganic bases include (but are not limited to) lithium hydroxide, sodium hydroxide, potassium hydroxide, lithium carbonate, sodium carbonate, potassium carbonate, lithium hydride, sodium hydride, potassium hydride, lithium alkoxide, sodium alkoxide, potassium alkoxide (wherein the alkoxide can be, but is not limited to, methoxide, ethoxide, propoxide, butoxide (including t-butoxide), and the like), and the like, as well as mixtures thereof. The reactants are dissolved in any solvent capable of dissolving the reactants, such as methanol, ethanol, propanol, butanol, dioxane, acetone, toluene, nitrobenzene, dimethyl formamide, dimethyl sulfoxide, 1-methyl-2-pyrrolidinone, 1-cyclohexyl-2-pyrrolidinone, sulfolane, and the like, as well as mixtures thereof. The solids content of the reaction mixture in one embodiment ranges from at least about 0.5 parts by weight solvent per every 1 part by weight $C_{15}$ phenol, to no more than about 20 parts by weight solvent per every 1 part by weight $C_{15}$ phenol, although the solids content can be outside of these ranges. Typically, the $C_{15}$ phenol and the base are added to the solvent, followed by heating the reaction mixture, to a temperature ranging from at least about 30° C., to no more than about 150° C., although the temperature can be outside of these ranges, for a period of time ranging from at least about 0.25 hour, to no more than about 8 hours, although the time can be outside of these ranges. By allowing the $C_{15}$ phenol and the base to react first, the $C_{15}$ phenoxide salt is formed; optionally, the 4-nitrophthalonitrile can be added with the $C_{15}$ phenol and the base in a single step, in which case the preheating step is eliminated. Thereafter, the 4-nitrophthalonitrile is added to the reaction mixture and the reaction mixture is then heated to a temperature ranging from at least about 30° C., to no more than about 150° C., although the temperature can be outside of these ranges, and for a period of time ranging from at least about 0.25 hour, to no more than about 24 hours, although the time can be outside of these ranges. Thereafter, the reaction mixture is cooled to a temperature ranging from at least about 20° C., to no more than about 60° C., although the temperature can be outside of these ranges, followed by quenching in a precipitant solvent, such as water, methanol, mixtures thereof, and the like, by stirring the reaction solution into the precipitant solvent (or vice-versa) in an amount ranging from at least about 0.25 part by weight precipitant solvent per every 1 part by weight reaction solution, to no more than about 2 parts by weight precipitant solvent per every 1 part by weight reaction solution, although the relative amounts can be outside of these ranges, thereby causing precipitation of the alkylarylether phthalonitrile intermediate product, which can be isolated by filtration. Thereafter, the intermediate can be reslurried with water or dilute acid (for example, 2 percent wt/volume hydrochloric acid) or base (for example, 2 percent sodium hydroxide) and filtered, and then reslurried and filtered with water, and the process repeated until most inorganic and/or organic salts are removed from the product. If desired, the product can be further purified by slurrying it in a solvent, such as methanol, ethanol, propanol, isopropanol, acetone, N,N'-dimethylformamide, mixtures thereof, mixtures of one or more of these solvents with water, and the like, followed by isolation of the product by filtration, which process may remove minor organic contaminants from the alkylarylether phthalonitrile intermediate. Thereafter, the solid product can, if desired, be dried by heating under vacuum at a temperature ranging from at least about 25° C., to no more than about 50° C., although the temperature can be outside of these ranges, for a period of at least about 1 hour to no more than about 72 hours, although the time can be outside of these ranges. The yield of the dried product typically (although not necessarily) ranges from about 80 to 90 percent. Purity of the final product in one embodiment (although not necessarily) is greater than about 98 percent, as ascertained by any conventional analytical technique, such as High Performance Liquid Chromatography (HPLC), Nuclear Magnetic Resonance (NMR) Spectroscopy, or Infrared (IR) Spectroscopy. Optionally, if desired, the product can be recrystallized by heating in a solvent, such as methanol, ethanol, isopropanol, and the like, cooling to about 0° C., and filtering and drying the crystals.

For the synthesis of the alkylaryl ether derivative of phthalonitrile, such as for example the $C_{15}$ phenol (3-n-pentadecylphenol) derivative obtained by reaction with 4-nitrophthalonitrile, the molar ratio of $C_{15}$ phenol to 4-nitrophthalonitrile can range from at least about 1:1, to no more than about 1.5:1, although the molar ratio can be outside of these ranges, and the molar ratio of $C_{15}$ phenol to base can range from at least about 1:1, to no more than about 3:1, although the molar ratio can be outside of these ranges.

The second step in the synthesis of the colorant molecules entails conversion of the alkylaryl ether phthalonitrile derivative to the alkylaryl ether-derivatized soluble copper phthalocyanine dye.

This process can be carried out by reacting the alkylaryl ether phthalonitrile precursor with a metal compound. Examples of suitable metal compounds include anhydrous and hydrated salts or complexes of the formula $MX_n \cdot yH_2O$, wherein M is a metal, such as lithium, sodium, potassium, beryllium, magnesium, calcium, scandium, titanium, zirconium, vanadium, niobium, chromium, Molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benzoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof. The alkylarylether-derivatized phthalonitrile precursor, a metal compound, and a solvent, such as ethylene glycol, amyl alcohol, hexanol, heptanol, tetralin, decalin, ISOPAR® (refined mineral spirits solvents available from Exxon), xylene, tributyl amine, N,N-dimethylaniline, quinoline, 1-chloronaphthalene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethylsulfoxide, N,N-dimethylformamide, N,N-dimethylacetamide, 1-methyl-2-pyrrolidinone, N-cyclohexyl-2-pyrrolidinone, sulfolane, and the like, as well as mixtures hereof, are combined to form the reaction mixture. The solids content of the reaction mixture in one embodiment is at least about 3 parts by weight alkylarylether phthalonitrile adduct per every 100 parts by weight solvent, and in another embodiment is at least about 10 parts by weight alkylarylether phthalonitrile adduct per every 100 parts by weigh solvent, and in one embodiment is no more than about 60 parts by weight alkylarylether phthalonitrile adduct per every 100 parts by weight solvent, and in another embodiment is no more than about 30 parts by weight alkylarylether phthalonitrile adduct per every 100 parts by weight solvent, although the solids content can be outside of these ranges. The reaction mixture is heated to reflux with internal temperatures ranging from about 80° C. to about 200° C., although the temperature can be outside of these ranges. The reaction mixture is refluxed for a period of time ranging from about 1 hour to about 16 hours, although the time can be outside of these ranges. Thereafter, the reaction is cooled to a temperatures ranging from about 25° C. to about 100° C., although the temperature can be outside of these ranges, then filtered typically through a filter made of either paper, glass fiber, polypropylene, GORETEX®, and the like, and washed with a solvent, such as water, acetone, methyl ethyl ketone, methyl isobutyl ketone, methanol, ethanol, propanol, butanol, acetone, dimethyl formamide, dimethyl sulfoxide, N-methylpyrrolidinone, sulfolane, and the like, as well as mixtures thereof. If desired, the precipitated blue solids can then again be filtered, reslurried with a solvent, such as acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof, for a period of time ranging from at least about 0.5 hour to about 24 hours, although the time can be outside of these ranges, and at a temperature of at least about 25° C. to about 100° C., although the temperature can be outside of these ranges. The product is then filtered again and dried using standard methods for drying solids.

If desired, a catalyst or reaction promoter can also be included in the reaction mixture. Examples of suitable catalysts or reaction promoters include trialkanolamines, dialkyl monoalkanolamines, monoalkyl dialkanolamines, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof.

Suitable catalysts or reaction promoters also include ammonia-releasing compounds. Suitable ammonia-releasing compounds are any ammonium salts that release ammonia when heated, including (but not limited to) ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. When an ammonia-releasing compound is employed as a catalyst or reaction promoter, while not required, in a specific embodiment, the reaction of the alkylarylether phthalonitrile precursor with the copper salt takes place with a two stage temperature-warming, profile. The first stage entails heating the reaction mixture to an intermediate temperature, in one embodiment of at least about 80° C., and in one embodiment of no more than about 140° C., although the temperature can be outside of these ranges, and for a period of from time ranging from about 0.25 hour to about 3 hours, although the time can be outside of these ranges, during which time ammonia gas is slowly released. Thereafter, the reaction mixture is heated to a final temperature ranging from about 120° C. to about 250° C., although the temperature can be outside of these ranges, and for a period of time of about 1 hour, to no more than about 24 hours, although the time can be outside of these ranges.

For the example synthesis of the peripherally-substituted soluble metal phthalocyanine dye molecule whose structural isomers were shown previously, the molar ratio of the 3-pentadecylphenoxy phthalonitrile precursor to metal compound in one embodiment can range from at least about 2:1, to no more than about 10:1, and in another embodiment is no more than about 6:1, although the molar ratio can be outside of these ranges. When a catalyst or reaction promoter is used, the molar ratio of catalyst or reaction promoter to metal compound in one embodiment can range from at least about 0.1:1, to no more than about 10:1, although the molar ratio can be outside of these range.

In cases where it is desired, a metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, and wherein the aryl portions thereof in one embodiment have from 6 to about 12 carbon atoms, although the number of carbon atoms in either the alkyl or aryl portions can be outside of this range. The acid is present in the water or alcohol solution in any desired or effective concentration, ranging from at least about 1 percent by weight acid, to not more than about 10 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Alternatively, the metal-free phthalocyanine dye can be prepared by heating a concentrated solution of 4-(3-pentadecyl)phenoxyphthalonitrile in a dialkyl monoalkanolamine solvent, with specific examples including 2-dimethylaminoethanol, 2-diethylaminoethanol, 2-dimethylamino-1-propanol, and the like, as well as mixtures thereof, in the presence of an ammonia-releasing, compound. The ratio by weight of 4-(3-pentadecyl)phenoxy-phthalonitrile to dialkyl monoalkanolamine solvent in one embodiment is at least about 10:90, and no more than about 50:50, although the relative amounts can be outside of these ranges. Suitable ammonia-releasing compounds include those listed hereinabove with respect to catalysts or reaction promoters. The molar ratio of ammonia-releasing compound to 4-(3-pentadecyl)phenoxyphthalonitrile is at least about 0.1 molar equivalent ammonia-releasing compound per every 1 molar equivalent of 4-(3-pentadecyl)phenoxyphthalonitrile, to no more than about 5 molar equivalents ammonia-releasing compound per every 1 molar equivalent of 4-(3-pentadecyl)phenoxyphthalonitrile, although the relative amounts can be outside of these ranges. The mixture can be initially heated to a first temperature to promote slow release of ammonia, ranging from at least about 50° C., to no more than about 125° C., although the temperature can be outside of these ranges, and for a period of time ranging from at least about 10 minutes, to no more than about 120 minutes, although the time can be outside of these ranges, then is subsequently heated to a second temperature which is higher than the first temperature, ranging from at least about 120° C. to no more than about 200° C., although the temperature can be outside of these ranges, for a period of time ranging from at least about 1 hour, to no more than about 24 hours, although the time can be outside of these ranges. Thereafter, the reaction mixture is cooled to a temperature of at least about 25° C., to no more than about 105° C. although the temperature can be outside of these ranges, and the product is separate by filtration or by decantation and washed with a solvent, such as water, acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof. If desired, the precipitated blue solids can then again be filtered, reslurried with a solvent, such as acetone, methyl ethyl ketone, methyl isobutyl ketone, methanol, ethanol, propanol, butanol, acetone, dimethyl formamide, dimethyl sulfoxide, N-methylpyrrolidinone, sulfolane, and the like, as well as mixtures thereof, in relative amounts of at least about 3 parts by weight solvent per every 1 part by weight product, to no more than about 100 parts by weight solvent per every 1 pant by weight product, although the relative amounts can be outside of these ranges, and for a period of time ranging from about 0.5 hour to no more than about 24 hours, although the time can be outside of these ranges, and at a temperature ranging from about 25° C. to about 100° C., although the temperature can be outside of these ranges. The product is then filtered again and dried using standard procedures for drying solids.

If desired, the alkylarylether phthalonitrile precursor need not be isolated by addition of a precipitant prior to its reaction with the metal compound. The reaction mixture in which the alkylarylether phthalonitrile was formed can, if desired, optionally be filtered to remove any inorganic salts, followed by addition to the reaction mixture of the metal compound and, optionally, any desired reaction promoter. Thereafter, the reaction mixture is heated to a temperature ranging from at least about 120° C., to no more than about 200° C., although the temperature can be outside of these ranges, for a period of time ranging from at least about 1 hour, to no more than about 24 hours, although the time can be outside of these ranges. The phthalocyanine product thus formed can then be isolated as described hereinabove with respect to the two-step process.

Other details of the production of such hydrophobically substituted, soluble metal-phthalocyanine dyes can be found, for example, in U.S. Pat. No. 6,476,219, the entire disclosure of which is incorporated herein by reference.

In additional embodiments, other compounds having different structures than those described previously may be used in addition to the hydrophobically substituted soluble metal-phthalocyanine dyes described herein, to function as surface active agents (or surfactants) that assist with either preventing or limiting the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such branched alcohols, non-ionic surfactants including long-chain or branched hydrocarbon alcohols, such as for example 2-ethylhexanol, lauryl alcohol, and stearyl alcohol, and alcohol ethoxylates; acrylic-based polymers such as poly(acrylic acid), poly(methyl methacrylate), styrene-based copolymers such as poly(styrene sodiosulfonate) and poly(styrene)-co-poly(alkyl(meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The nano-sized pigment particles comprise an unsubstituted phthalocyanine compound as a main insoluble component, and a minor amount of a substituted metal-phthalocyanine dye, the general structures of which are:

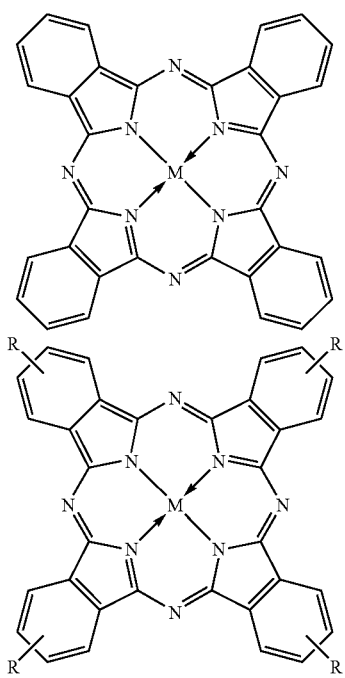

The substituted metal-phthalocyanine dye molecules are non-covalently associated with the pigment molecules in either a random or ordered structure, or may even be intercalated within the crystal or particle structure of the unsubstituted phthalocyanine pigment component, with the crystal growth inhibitory effect of the substituted metal-phthalocyanine dye molecules being determined, by processing conditions for preparing the nanopigment composition, relative ratio of the two phthalocyanine components, selection and number of substituents of the specific substituted metal-phthalocyanine dye molecule, and the like.

The term "intercalated" refers, for example, to molecules of the soluble substituted metal-phthalocyanine dye being interpenetrated between stacked layers of the phthalocyanine chromogen or molecule. In addition to intercalation, the soluble dye molecules may also be non-covalently associated with the copper phthalocyanine pigment nanoparticles at either the termini of crystal aggregates, at edges of crystal aggregates, as surface capping molecules, or as various combinations of all these modes of association, depending on the structure of the substituted metal-phthalocyanine dye. The types of non-covalent chemical bonding that can occur between the precursor/pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the precursor/pigment.

According to embodiments, the nano-sized pigment particles can be formed using a synthesis method that takes advantage of the inherent self-assembly of phthalocyanine molecules. This is a "bottom-up" assembly method, in that assembly of the nanopigment starts on the molecular level, with the directional crystal growth of the phthalocyanine chromogen being regulated by the presence of a minor amount of substituted soluble metal-phthalocyanine dye molecules. In contrast to using typical manufacturing methods for producing nanoscale-sized pigments by subjecting crude, bulk synthesized pigments to extensive high-energy mechanical grinding processes, the resultant products are obtained in a simple, low-cost and rapid process based on self-assembly and have a desired average particle size in the nanometer scale size range, with a much narrower particle size distribution and more uniform crystal structure.

In embodiments, the nano-sized pigment particles are formed in any suitable manner that utilizes self-assembly as a design feature. Thus, for example, one method for forming the nano-sized particles of phthalocyanine pigments is to enable a small amount of the substituted metal-phthalocyanine dye solvated as molecules in a liquid medium, such as for example an organic solvent, to mix in and co-assemble with the phthalocyanine chromogen molecules, such as in the molecularly dispersed state just prior to the onset of pigment crystal growth. In this mixed state, the phthalocyanine chromogen molecules become organized and crystal particle growth can proceed but is being mediated and limited by the presence of the small amount of substituted metal-phthalocyanine dye molecules.

In a second embodiment, still more control over the crystal growth, and thus over nanoparticle size, size distribution, and particle shape, can be achieved by utilizing precursor raw materials for making phthalocyanines in the initial process, rather than pre-formed phthalocyanine compounds. That is, in the self-assembly method of making nano-sized pigment particles of phthalocyanine pigments, the synthetic precursors of the phthalocyanine chromogen are mixed to form either an intermediate species, or is followed by addition of the remaining reactants that form the phthalocyanine pigment compound in the presence of a small amount of substituted soluble metal-phthalocyanine dye molecules. In this manner, crystal growth of the phthalocyanine chromogen is more precisely controlled, and the extent and direction of crystal particle growth is regulated in the presence of the substituted metal-phthalocyanine dye molecules, which are in effect functioning as crystal growth inhibitors. Furthermore, because the phthalocyanine chromogen molecules are formed upon addition of the coordinating metal ion, it is expected that there is a low, steady concentration of formed metal phthalocyanine underlying the nano-sized pigment crystal growth.

In yet another embodiment, a preferred mode of controlling the extent of crystal growth and therefore of phthalocyanine nanoparticle size, distribution and shape, and potentially the optical and electronic properties of such nano-sized pigments, can be achieved by utilizing only the precursor raw materials for synthesizing both the unsubstituted phthalocyanine pigment as well as the small amount of substituted soluble metal-phthalocyanine dye molecules. In this manner, the small amount of substituted metal-phthalocyanine dye is generated in situ concomitantly with the synthesis of the unsubstituted phthalocyanine chromogen. In this manner, the extent and direction of phthalocyanine crystal growth is more controlled, allowing the crystal growth inhibiting action of the substituted metal-phthalocyanine dye molecules to take full effect. This inhibitory action would be tunable by several processing factors, which include, but are not limited to, structure type and number of hydrophobic substituents on the soluble metal-phthalocyanine dye, relative ratio of the dye precursors to the phthalocyanine chromogen precursors, choice of reaction process chemistry, reactant concentrations and ratios, reaction temperature, solvents, catalysts, reaction time, and product isolation steps.

In embodiments, the synthetic precursors for making nano-sized particles of phthalocyanine pigments can consist of for example, phthalic anhydride or a phthalic acid derivative such as phthalonitrile, metal salt compound, and a substituted soluble metal-phthalocyanine dye compound. The molar ratio of the phthalic anhydride or phthalonitrile precursor to metal compound in one embodiment can range from at least about 2:1, to no more than about 10:1, and in another embodiment is no more than about 6:1, although the molar ratio can be outside of these ranges. The molar ratio of the substituted soluble metal-phthalocyanine dye compound to metal compound in one embodiment can range from at least about 0.005:1, to no greater than about 1:1, and in another embodiment is at least about 0.01:1 and less than about 0.3:1, although the molar ratio can be outside of these ranges.

This process of forming a metal phthalocyanine from precursor raw materials in a two-step process is described in detail in U.S. Pat. No. 5,318,623, the entire disclosure of which is incorporated herein by reference. In that method, the metal phthalocyanine pigment is formed by the steps of: reacting phthalic anhydride or a derivative thereof with urea or a derivative thereof with heating in the presence of a catalyst either in the presence or absence of an organic solvent; adding to the reaction mixture of the preceding step a metal or its compound capable of constituting the core of said metal phthalocyanine either alone or together with urea or a derivative thereof; without isolating the reaction product from the reaction mixture of the preceding step; and allowing the reaction mixture to react.

For example, examples of the phthalic anhydride or its derivative to be used in the process include phthalic acid and salts or esters thereof phthalic anhydride, phthalimide, phthalamic acid and salts or esters thereof, phthalonitrile, and compounds having the same structures as the above-enumerated compounds provided that they have a substituent such as a chlorine atom, a bromine atom, an alkyl group, a phenyl group, or a sulfonic group on the benzene nucleus. Examples of the urea or its derivative to be used in the present invention include urea and ammonia. The amount of the urea or a derivative thereof to be used in the first step of the reaction is generally from about 4 to about 40 mol, such as from about 4 to about 20 mol, per about 4 mol of the phthalic anhydride or its derivative. The amount of the optional urea or a derivative thereof to be used in the second step of the reaction is generally from 0 to about 20 mol, such as from 0 to about 10 mol, per about 4 mol of the phthalic anhydride or its derivative.

Additionally, 1,3-diiminoisoindolene, which is derived by isolating the reaction product of phthalonitrile and ammonia, can be used in the preparation of phthalocyanines, by heating in the presence of a metal or its compound, or by itself, in the presence or absence of a solvent. As described above, the phthalonitrile used for the preparation of said isoindolene can be unsubstituted, or have suitable substituent groups attached to the aromatic ring, so as to afford either unsubstituted or peripherally substituted phthalocyanines as desired.

About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference. Examples of suitable atoms or group of atoms M include, but are not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus(III), dichlorotitanium(IV), dichlorosilicon, dichlorogermanium, dichlorotin, and the like as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium (IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof. The amount of the metal or a compound thereof to be used is generally about from about 0.8 to about 1.3 mol per about 4 mol of phthalic anhydride or its derivative.

Examples of the catalyst to be used in the process include molybdenum compounds such as ammonium molybdate, molybdenum oxide and phosphorus molybdate; titanium compounds such as titanium tetrachloride and titanic acid esters; zirconium compounds such as zirconium chloride and zirconium carbonate; antimony oxide; arsenic oxide; and boric acid. The amount of the catalyst is generally from about 0.01 to about 5% by weight, such as from about 0.03 to about 2% by weight, based oil the amount of the phthalic anhydride or its derivative.

Examples of the organic solvent which may be used in the reaction include aromatic hydrocarbons such as alkylbenzenes, alkylnaphthalenes, a tetralin; alicyclic hydrocarbons such as alkylcyclohexanes, decalin, and alkyldecalins; aliphatic hydrocarbons such as decane and dodecane; and nitrobenzene, o-nitrotoluene, trifluorobenzene, dichlorobenzene, chloronaphthalene, diphenyl ether, sulfolane, dimethyl sulfoxide, methylsulfolane, dimethylsulfolane, N-methylpyrrolidone, and dimethylimidazolidinone. As the organic solvent which may be used in the second step of the reaction with the addition of the metal capable of constituting the core or a compound of the metal, a hydrophilic solvent can be employed, in addition to the above-enumerated solvents. Examples of the hydrophilic solvent include alcohols such as butyl alcohol, ethylene glycol, and poly(ethylene glycol); Cellosolves such as ethyl Cellosolve and diethylene glycol; and dimethylformamide, formamide, a dimethylacetamide. These organic solvents may be used alone or as a mixture of two or more thereof. The amount of the solvent, if used, is generally from about 0.3 to about 30 times by weight, such as about 0.5 to about 11 times by weight, the amount of the phthalic anhydride or its derivative.

For example, in the case where the pigment chromogen is a metal phthalocyanine, this bottom-up production process involves a first step of mixing phthalic anhydride and urea as the raw materials to establish the porphyrin ring system of the phthalocyanine structure. A second step then involves late-stage addition of the coordinating metal (such as copper salt for forming copper phthalocyanine) at the same time that the substituted metal-phthalocyanine dye molecules are also added. In this manner, the addition of the coordinating metal causes formation of the phthalocyanine pigment molecules in the presence of the hydrophobic metal-phthalocyanine dye molecules, and thus crystal growth can be more easily regulated. For ease of addition of the coordinating metal, it can be added in any suitable form such as salt form, which allows the metal ions to dissociate in the reaction medium.

If desired or helpful, such as for minimizing pigment crystal growth and aggregation of the pigment particles, the process can be conducted at elevated temperature, in the presence of mixing, or the like. For example, if desired, the reaction process can be conducted under an elevated temperature of from about 50° C. to about 500° C., such as from about 75° C. to about 400° C. or from about 100° C. to about 300° C. In an embodiment, the elevated temperature can be from about 150° C. to about 250° C. or about 200° C. Likewise, the reaction process can be conducted in the presence of mixing, such as by a mechanical stirrer, a high shear mixer, or the like. Alternatively, ultrasonification can be used to minimize particle aggregation during the formation of the pigment. Both elevated temperature and mixing or ultrasonification can also be used together, in embodiments. Additionally, the distribution of particle sizes can potentially be narrowed with further optimization of the process parameters, such as the choice of reaction solvent, the relative amounts of tetra-substituted metal-phthalocyanine dye to o-phthalonitrile precursor, temperature and reaction time, precipitation methods and also in procedures for isolation and drying of the pigment product (by either freeze-drying, or vacuum-drying at reduced temperature).

The formed nanoscale pigment particle compositions can be used, for example, as coloring agents in a variety of compositions, such as in liquid (aqueous or non-aqueous) ink vehicles, including inks used in conventional pens, markers, and the like, liquid inkjet ink compositions, solid or phase change ink compositions, and the like. For example, the colored nanoparticles can be formulated into a variety of ink vehicles, including "low energy" solid inks with melt temperatures of about 60° to about 130° C., solvent-based liquid inks or radiation-curable such as UV-curable liquid inks comprised of alkyloxylated monomers, and even aqueous inks. The ink compositions can be used in a variety of conventional ink jet printing process, including thermal, acoustic, drop-on-demand, piezoelectric, and the like.

In addition to ink compositions, the nano-sized phthalocyanine pigment particle compositions can be used in a variety of other applications, where it is desired to provide a specific color to the composition. For example, the compositions can also be used in the same manner as conventional pigments in such uses as colorants for paints, coatings and automotive finishes, plastic resins, lenses, optical filters, all types of printing inks, and the like according to applications thereof. By way of example only, the compositions of embodiments can be used for toner compositions, which include polymer particles and nano-sized pigment particles, along with other optional additives, that are formed into toner particles and optionally treated with internal or external additives such as flow aids, charge control agents, charge-enhancing agents, filler particles, radiation-curable agents or particles, surface release agents, and the like. The toner composition of the present invention can be prepared by a number of known methods including extrusion melt blending of the toner resin particles, nano-sized pigment particles and other colorants and other optional additives, followed by mechanical comminution and classification. Other methods include those well known in the art such as spray drying, melt dispersion, extrusion processing, dispersion polymerization, and suspension polymerization. Further, the toner compositions can be prepared by emulsion/aggregation/coalescence processes, as disclosed in U.S. Pat. Nos. 5,290,654, 5,278,020, 5,308,734, 5,370,963, 5,344,738, 5,403,693, 5,418,108, 5,364,729, and 5,346,797, the entire disclosures of which are incorporated herein by reference. The toner particles can in turn be mixed with carrier particles to form developer compositions. The toner and developer compositions can be used in a variety of electrophotographic printing systems.

In addition to ink and toner applications, the nanopigments of embodiments can be applied in other fields where phthalocyanine pigments are typically used. For example, the nanopigments can be used in applications that make use of optoelectronic compounds, such as for charge generating materials in electrophotographic imaging members, and the like.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Preparation of Phthalonitrile Synthetic Precursor to the Tetra-Substituted, Soluble Metal-Phthalocyanine Dye 4-(3-pentadecylphenoxy)phthalonitrile, prepared by the method below, as disclosed in Example I of U.S. Pat. No. 6,476,219, the disclosure of which is totally incorporated herein by reference.

To a 500 milliliter round bottomed flask equipped with magnetic stirrer is added 45.3 grams (0.15 mole) of CARDOLITE® $NC_{510}$ (predominantly a meta-substituted $C_{15}$ alkyl phenol of the formula

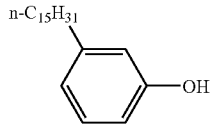

obtained from cashew nut distillation and containing small amounts of naturally occurring isomers thereof, obtained from Cardolite Corporation, Newark, N.J.), 9.3 grams (0.68 mole) of potassium carbonate (obtained from Aldrich Chemical Co., Milwaukee, Wis.), and 260 grams of 1-methyl-2-pyrrolidinone (NMP, anhydrous, obtained from Aldrich Chemical Co.). The mixture is heated in a 90° C. oil bath for one hour. Thereafter, 25 grams (0.14 mole) of 4-nitrophthalonitrile (obtained from Aldrich Chemical Co., Milwaukee, Wis.) is added to the reaction mixture and the mixture is maintained at 90° C. for an additional 4 hours. The reaction mixture is then cooled to about 25° C. and is quenched in 600 milliliters of deionized water. The precipitated solid is separated by filtration, reslurried with about 600 milliliters of deionized water, and is again filtered; this process was repeated until the water used to wash the solid product was of neutral pH. The solids are then air-dried and combined with about 350 grams of isopropanol at 25° C. The resultant suspension is recrystallized by cooling in an ice bath, and the crystals are filtered and air-dried to give 54.4 grams (87.6% yield) of 4-(3-pentadecyl)-phenoxyphthalonitrile. The purity of this material as measured by HPLC is about 97%.

Example 2

Preparation of the Tetra-Substituted, Soluble Metal-Phthalocyanine Dye

Tetra[(3-pentadecylphenoxy)] copper phthalocyanine dye, prepared by the method disclosed in Example VIII of U.S. Pat. No. 6,476,219, the disclosure of which is totally incorporated herein by reference.

A solution of 60.8 grams (0.14 mole) of 4-(3-pentadecyl) phenoxyphthalonitrile, prepared as described in Example 1, is dissolved into 195 mL of NMP in a 500 mL flask fitted with a mechanical stirrer, maintained under a nitrogen atmosphere, and is treated with 6.24 grams (0.031 mole) of copper(II) acetate monohydrate, and 6.24 grams (0.070 mole) of 2-dimethylaminoethanol (DMAE). The mixture is stirred and heated at 180° C. for 6 hours, then cooled to 80° C. The mixture is then filtered, and the solids are rinsed in the filter with 120 mL of NMP. The solids are then reslurried and filtered three times with 120 mL portions of methyl ethyl ketone. After drying for 48 hours at 30° C. under vacuum, the product is obtained as a dark blue coarse powder (44 grams, 80%). The spectral strength of this dye is measured to be $1.28 \times 10^5$ A*mL/g, indicating a purity of over 98%.

Example 3

Preparation of Nano-Sized Particles of Copper Phthalocyanine Pigment

Into a 500 mL Omni Mixer Homogenizer is added phthalic anhydride (10 grams, 67.51 mmols, available from Sigma Aldrich Fine Chemicals, Milwaukee, Wis.), urea (6.49 grams, 108.02 mmols, available from Sigma Aldrich Fine Chemicals), ammonium molybdate (0.07 grams, 0.34 mmols, available from Sigma Aldrich Fine Chemicals) and nitrobenzene (250 milliliters). The mixture is heated to 200° C. and stirred vigorously for 1 hr. Glass beads, the tetra-substituted soluble metal-phthalocyanine dye of Example 2 (12.15 grams, 6.75 mmols; as disclosed in Example VIII of U.S. Pat. No. 6,476, 219, the disclosure of which is totally incorporated herein by reference), and copper chloride (1.81 grams, 13.50 mmols, available from Sigma Aldrich Fine Chemicals) are added to the reaction mixture. The reaction mixture is stirred vigorously for 3 hrs at 200° C. The reaction product is filtered and the filter cake is washed with methanol and water and dried to give copper phthalocyanine pigment having predominantly nano-sized particles, and rod-like shape as determined by Transmission Electron Microscopy (TEM). The distribution of particle sizes can potentially be narrowed with further optimization of the process parameters, such as the choice of reaction solvent, the relative amounts of tetra-substituted metal-phthalocyanine dye to o-phthalonitrile precursor, temperature and reaction time, use of high-speed stirring/shearing/ultra-sonification conditions during reaction, precipitation methods and also in procedures for isolation and drying of the pigment product (by either freeze-drying, or vacuum-drying at reduced temperature).

Example 4

Preparation of Nano-Sized Particles of Copper Phthalocyanine Pigment

Into a 50 mL round-bottom flask is added o-phthalonitrile (9 g, 70.2 mmol, 3.6 eq.), 4-(3-pentadecylphenoxy)-o-phthalonitrile prepared as in Example 1 (3.36 g, 7.8 mmol, 0.4 eq.), copper acetate (3.6 g, 19.5 mmol, 1 eq.), catalyst DMAE (20 mg—2 drops), and the solvent N-methyl pyrrolidone (NMP, 30 mL). The mixture is stirred and heated to 160° C. for 12 hours, cooled to 100° C., filtered and then washed first with hot DMF, and then acetone, and then is dried with mild heating (50° C.). The solid is isolated as a dark blue powder, and images obtained by Transmission Electron Microscopy (TEM) showed predominantly nano-sized particles (<100 nm) having rod-like shapes, along with a few larger-sized aggregates (1-2 μm) and loose agglomerates of such particles.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. Nano-sized phthalocyanine pigment particles, comprising:
   a phthalocyanine chromogen structure as a main component, and
   a substituted soluble metal-phthalocyanine dye as a minor component that non-covalently bonds with the phthalocyanine chromogen structure, molecules of the substituted soluble metal-phthalocyanine dye being intercalated between layers of the phthalocyanine chromogen structure,
   wherein the substituted soluble metal-phthalocyanine dye is

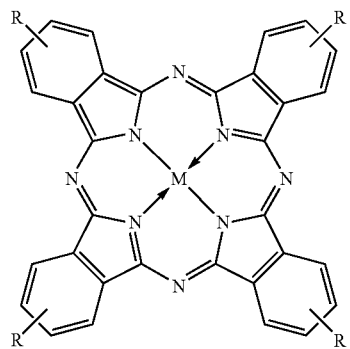

where:
M is a metal or group of metals and atoms capable of bonding to a central cavity of the phthalocyanine molecule; and
each R independently represents H or a sterically bulky substituent, provided that at least one R is other than hydrogen, and the sterically bulky substituent is a wax-like aliphatic group or an alkylaryl or arylalkyl group, where:
  the alkylaryl or arylalkyl group comprises a C=N or C=S double bond, or
  the alkylaryl or arylalkyl group is fully saturated consisting of a hydrocarbon group.

2. The nanometer-sized pigment particles of claim 1, wherein the phthalocyanine chromogen is a metal phthalocyanine.

3. The nanometer-sized pigment particles of claim 1, wherein the phthalocyanine chromogen is a metal phthalocyanine, the metal being selected from the group consisting of lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, and lead.

4. The nanometer-sized pigment particles of claim 1, wherein M is selected from the group consisting of lithium, sodium, or potassium atoms, a divalent metal atom, a divalent halometal or -metalloid group, a divalent hydroxy metal group, a divalent oxo-metal group, and a divalent metal- or metalloidal-oxyhydrocarbon group wherein the oxyhydrocarbon group is an oxyalkyl group, an oxyaryl group, an oxyalkylaryl group, an oxyarylalkyl group, an oxyheterocyclic group, or mixtures thereof and contains from one to about twenty carbon atoms.

5. The nanometer-sized pigment particles of claim 1, wherein M is selected from the group consisting of lithium, sodium, potassium, beryllium, magnesium, calcium, strontium, barium, chromium, manganese, iron, cobalt, nickel, copper, zinc, tin, lead, cadmium, chloroiron(III), chlorotitanium(III), chlorochromium(III), chloroaluminum, chlorogallium, chloroindium, chlorophosphorus(III), dichlorotitanium (IV), dichlorosilicon, dichlorogermanium, dichlorotin, corresponding fluorides, bromides, and iodides, hydroxyaluminum, hydroxygallium, dihydroxysilicon, dihydroxygermanium, dihydroxytin, oxo-molybdenum(IV), oxo-vanadium(IV), oxo-titanium(IV), alkoxyaluminum, alkoxygallium, dialkoxysilicon, and diaryloxygermanium, wherein the oxyhydrocarbon group is an oxyalkyl group, an oxyaryl group, an oxyalkylaryl group, an oxyarylalkyl group, an oxyheterocyclic group, or mixtures thereof and contains from one to about twenty carbon atoms.

6. The nanometer-sized pigment particles of claim 1, wherein each R other than hydrogen is independently selected from the group consisting of substituted or unsubstituted alkylaryl groups, and substituted or unsubstituted arylalkyl groups, having from 1 to about 50 carbon atoms.

7. The nanometer-sized pigment particles of claim 1, wherein each R is the same.

8. The nanometer-sized pigment particles of claim 1, wherein the nanometer-sized pigment particles have an average particle size of from about 1 nm to about 150 nm.

9. The nanometer-sized pigment particles of claim 1, wherein a molar ratio of the substituted soluble metal-phthalocyanine dye to the phthalocyanine chromogen structure is from about 0.005:1 to about 1:1.

10. A process for preparing nano-sized phthalocyanine pigment particles of claim 1, the process comprising:
   providing a phthalocyanine chromogen material,
   providing a substituted metal-phthalocyanine dye as a minor component that non-covalently bonds with the phthalocyanine chromogen material, molecules of the substituted soluble metal-phthalocyanine dye being intercalated between layers of the phthalocyanine chromogen material, the substituted soluble metal-phthalocyanine dye being represented by:

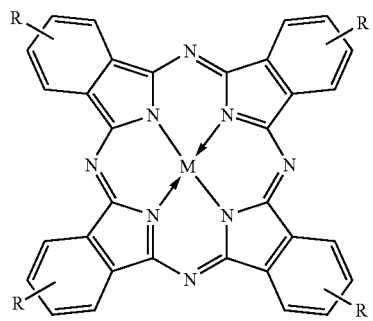

where:
- M is a metal or group of metals and atoms capable of bonding to a central cavity of the phthalocyanine molecule, and
- each R independently represents H or a sterically bulky substituent, provided that at least one R is other than hydrogen, and the sterically bulky substituent is a wax-like aliphatic group or an alkylaryl or arylalkyl group, where:
  - the alkylaryl or arylalkyl group comprises a C=N or C=S double bond, or
  - the alkylaryl or arylalkyl group is fully saturated consisting of a hydrocarbon group,
- providing a solution of the substituted soluble metal-phthalocyanine dye, precursors to a substituted soluble metal-phthalocyanine dye, or a mixture thereof, and
- causing said substituted soluble metal-phthalocyanine dye molecules to non-covalently associate with the phthalocyanine chromogen material, so as to limit an extent of particle growth and aggregation and result in nanoscale-sized pigment particles.

11. The process of claim 10, further comprising mixing and optionally grinding one or more pigment precursors of the phthalocyanine chromogen material to a phthalocyanine pigment and the substituted soluble metal-phthalocyanine dye.

12. The process of claim 10, wherein the nanometer-sized pigment particles are formed without utilizing a grinding step to reduce the particle size of formed crystal particles.

13. The process of claim 10, the process comprising mixing the solution of a substituted soluble metal-phthalocyanine dye with one or more pigment precursor molecules of the phthalocyanine chromogen material in a molecularly dispersed state prior to the onset of pigment crystal growth.

14. The process of claim 10, wherein:
- the phthalocyanine chromogen material comprises one or more pigment precursors to a phthalocyanine pigment, and
- the process further comprises carrying out a chemical reaction whereby the precursors to a phthalocyanine pigment are transformed into final phthalocyanine pigment particles and the substituted soluble metal-phthalocyanine dye molecules are non-covalently associated with the phthalocyanine pigment, so as to limit an extent of particle growth and aggregation and result in nanoscale-sized pigment particles.

15. The process of claim 14, the process further comprising:
- reacting precursor raw materials of the phthalocyanine pigment to form an intermediate species; and
- adding metal ions to the intermediate species in the presence of the solution of a substituted soluble metal-phthalocyanine dye, precursors to a substituted soluble metal-phthalocyanine dye, or a mixture thereof, wherein the metal ions react with the intermediate species to form the phthalocyanine pigment.

16. The process of claim 15, wherein the precursor raw materials comprise phthalic anhydride, phthalonitrile, phthalic acid, or a derivative thereof; and optionally an ammonia-releasing agent.

17. The process of claim 14, wherein the solution comprises precursors to a substituted soluble metal-phthalocyanine dye, and the substituted soluble metal-phthalocyanine dye and the phthalocyanine pigment are generated in situ.

18. A toner composition comprising:
- the nanometer-sized pigment particles of claim 1,
- polymer particles, and
- optionally one or more additives.

19. An inkjet ink composition, comprising:
- a liquid vehicle,
- the nanometer-sized pigment particles of claim 1, and
- optionally one or more additives.

20. The nanometer-sized pigment particles of claim 1, wherein each R other than hydrogen is independently selected from the group consisting of substituted or unsubstituted alkylaryl groups, and substituted or unsubstituted arylalkyl groups, having from 10 to about 30 carbon atoms.

* * * * *